United States Patent
Emami et al.

(10) Patent No.: US 12,290,070 B2
(45) Date of Patent: May 6, 2025

(54) MOSQUITO AGGREGATION COMPOSITION

(71) Applicant: MOLECULAR ATTRACTION AB, Hägersten (SE)

(72) Inventors: S. Noushin Emami, Stockholm (SE); Raimondas Mozuraitis, Stockholm (SE); Anna-Karin Borg-Karlson, Österskär (SE)

(73) Assignee: MOLECULAR ATTRACTION AB, Hägersten (SE)

( * ) Notice: Subject to any disclaimer, the term of this patent is extended or adjusted under 35 U.S.C. 154(b) by 821 days.

(21) Appl. No.: 17/047,145

(22) PCT Filed: Apr. 15, 2019

(86) PCT No.: PCT/EP2019/059642
§ 371 (c)(1),
(2) Date: Oct. 13, 2020

(87) PCT Pub. No.: WO2019/197681
PCT Pub. Date: Oct. 17, 2019

(65) Prior Publication Data
US 2021/0161132 A1    Jun. 3, 2021

(30) Foreign Application Priority Data

Apr. 13, 2018 (SE) .................... 1850428-2

(51) Int. Cl.
| | | |
|---|---|---|
| *A01N 35/02* | (2006.01) | |
| *A01M 1/02* | (2006.01) | |
| *A01M 1/16* | (2006.01) | |
| *A01M 1/20* | (2006.01) | |
| *A01M 1/22* | (2006.01) | |
| *G01N 30/68* | (2006.01) | |
| *G01N 30/72* | (2006.01) | |

(52) U.S. Cl.
CPC .............. *A01N 35/02* (2013.01); *A01M 1/02* (2013.01); *A01M 1/16* (2013.01); *G01N 30/68* (2013.01); *G01N 30/7206* (2013.01); *A01M 1/20* (2013.01); *A01M 1/223* (2013.01)

(58) Field of Classification Search
CPC ............ A01M 1/02; A01M 1/16; A01M 1/20; A01M 1/223; A01N 35/02; G01N 30/68; G01N 30/7206
See application file for complete search history.

(56) References Cited

FOREIGN PATENT DOCUMENTS

| WO | WO-2004034783 A2 | 4/2004 | |
|---|---|---|---|
| WO | WO-2007099347 A2 | 9/2007 | |
| WO | WO 2010/101462 A1 * | 9/2010 | ............. A01N 37/02 |
| WO | WO-2010101462 A2 * | 9/2010 | ............. A01N 37/02 |
| WO | WO-2010143752 A2 | 12/2010 | |

OTHER PUBLICATIONS

Leal et al., "Attraction of Culex mosquitoes to aldehydes from human emanations."; Nature, Scientific Reports (2017) 7:17965; pp. 1-10; published online Dec. 21, 2017.*
Poda et al.; Nature Ecology & Evolution; 6, pp. 1676-1686; published online Sep. 15, 2022.*
International Search Report and Written Opinion for Application No. PCT/EP2019/059642, dated Aug. 13, 2019.
Verhulst et al., "Relation between HLA genes, human skin volatiles and attractiveness of humans to malaria mosquitoes", *Infection, Genetics and Evolution*, pp. 87-93 (2013).
Office Action in corresponding European application No. 19719453. 3, dated Dec. 22, 2023.
Meijerink et al., "Identification of Olfactory Stimulants for *Anopheles gambiae* from Human Sweat Samples", Journal of Chemical Ecology, vol. 26, No. 6, pp. 1367-1382 (2000).
Mozuraitis et al., "Volatiles released from foliar extract of host plant enhance landing rates of gravid *Polygonia c-album* females, but do not stimulate oviposition", Entomologis Experimentalis et Applicata, vol. 158, No. 3, pp. 275-283 (2016).

* cited by examiner

*Primary Examiner* — Jeffrey T. Palenik
(74) *Attorney, Agent, or Firm* — MARSHALL, GERSTEIN & BORUN LLP

(57) ABSTRACT

The present invention provides compositions that may act as a aggregation pheromone or a swarming pheromone for mosquitoes, wherein said compositions comprises decanal and optionally one or more of octanal, nonanal, sulcaton, and 3-hyrdroxy-2-butanone, as well as uses thereof for attracting mosquitoes, vector control, mosquito control, male quality assessment, population surveillance and monitoring, and risk assessment in epidemiological monitoring programmes.

8 Claims, 2 Drawing Sheets

MOSQUITO AGGREGATION COMPOSITION

TECHNICAL FIELD

The present invention relates to a mosquito aggregation composition and uses thereof.

BACKGROUND ART

Males of a wide number of mosquito species form groups of flying individuals within a limited space, so called swarms, as a prerequisite to mating (Downes J. A. in Annu. Rev. Entomol., 1969, vol. 14, pgs. 271-298). Swarming behaviour is documented in different anopheline and culicine mosquito species (Clements A. N. in The biology of mosquitoes, 1999, vol. 2, London: Chapman & Hall). Behavioural observations and experiments suggest that during flight in a swarm, males release odours at very low concentrations which attract both conspecific males and females to the swarm (reviewed by Vani'dkova L. et al., in Parasitol. Internat., 2017, vol. 66, pgs. 190-195). The components of the aggregation pheromone stimulating swarming have been fully characterized for *Aedes aegypti* (Fawaz et al., in J. Vector Ecol., 2014, vol. 39, pgs. 347-354).

Efficiency of the most commonly used control methods of mosquitoes as vectors for many pathogens and parasites by applying insecticide-treated bed nets and indoor residual spraying has decreased due to the rapid emergence and spread of insecticide resistance (Naqqash M. N. et al. in Parasitol. Res., 2016, vol. 115, pgs. 1363-1373).

Several further strategies have been attempted to control mosquito vectors, including the use of eco-friendly plant compounds with insecticidal activity, insect growth regulators microbial control agents etc. (Muema J. M. et al. in parasites and Vectors, 2017, vol. 10, no. 184) as well as sterile insect technique (SIT).

The success of the SIT is mostly dependent on the ability of sterile males to compete for mates with the wild ones in the field which very often is compromised to certain level (Lees R. S. et al. in Acta Trop. 2014, vol. 132, pgs. S2-S11 Suppl). Hence, there is a need for improvement of existing vector control methods including SIT and alternative means to control mosquitos.

SUMMARY OF THE INVENTION

It is an object of the present invention to provide a composition that may act as a mosquito aggregation pheromone or swarming pheromone for mosquitoes, for having successful swarming and mating of mosquitoes. It is further an object of the present invention to provide means and methods for vector control, mosquito control, male quality assessment, population surveillance and monitoring, as well as risk assessment in epidemiological monitoring programmes.

The objects above are in a first aspect attained by providing a mosquito aggregation composition comprising decanal and optionally one or more of octanal, nonanal, sulcatone and 3-hydroxy-2-buta none.

The composition may comprise 0-70 wt % octanal, 0-70 wt % nonanal, 10-70 wt % decanal, 0-40 wt % sulcatone and –0-30 wt % of 3-hydroxy-2-butanone.

The composition according to one embodiment comprises octanal, nonanal, decanal and sulcatone, and according to one further embodiment the composition comprises octanal, nonanal, decanal and sulcatone in the ratio of 11:41:34:14.

The composition according to another embodiment comprises octanal, nonanal, decanal, 20 sulcatone and 3-hydroxy-2-butanone, and according to a further embodiment the composition comprises octanal, nonanal, decanal, sulcatone and 3-hydroxy-2-butanone in the ratio of 15:28:31:21:5.

According to another aspect, there is provided the use of the composition according to the first aspect as a mosquito attractant.

According to another aspect, a mosquito trapping device is provided, said device comprising a composition according to the first aspect as a species specific lure to attract mosquitoes.

The device according to the aspect above may further comprise an effector for elimination of mosquitoes having been attracted to the device.

The device according to the aspect above may further comprise sticky inserts to fixate mosquitoes having been attracted to the device.

According to yet another aspect, a method for mosquito population surveillance or monitoring and/or risk assessment in epidemiological monitoring programmes is provided, comprising using the device according to the above mentioned aspect, and analysis of the mosquitoes having been attracted to the device, to evaluate quantity of mosquitoes and/or percentage of mosquitoes being vectors of pathogens and/or parasites.

According to yet another aspect, a method a method for assessing of mosquito male quality is provided, comprising the steps of:
a) enclosing 25-35 male mosquitoes in a container with outlets for odour collection;
b) collection of odours during swarming by said mosquitoes using solid phase micro extraction (SPME);
c) thermally desorbing the trapped odours into an injector of a gas chromatograph (GC);
d) measuring components comprised in the odours as well as amounts thereof by GC coupled to mass spectrometer or flame ionisation detector; and thereby determining the exact composition of said swarming odour, wherein the components and the amounts thereof comprised in the swarming odours collected from males treated with a sterilizing agent are measured and compared with the components and the amounts thereof comprised in the swarming odours collected from males not treated with said sterilizing agent.

Figure 1:
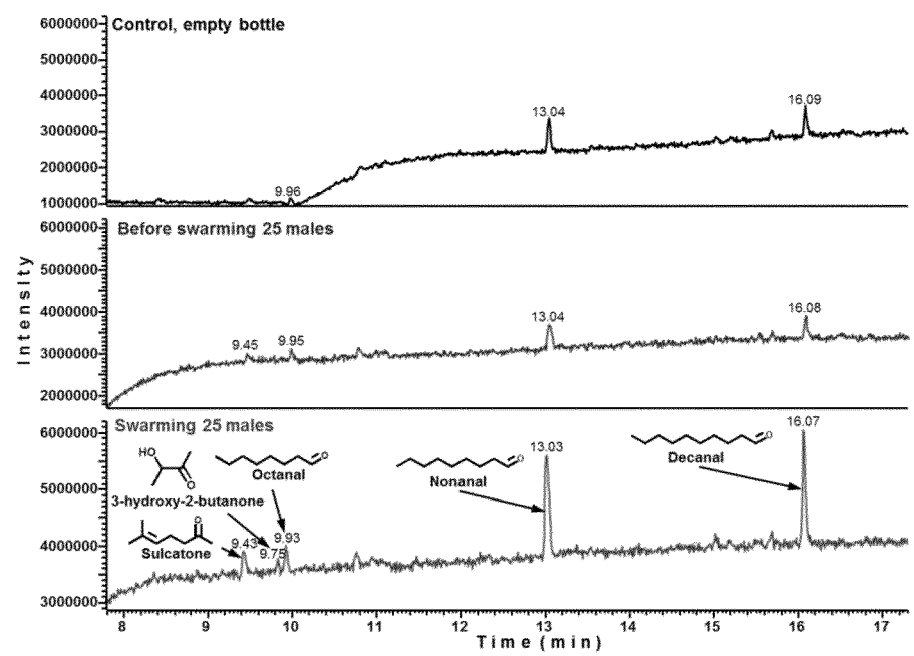
FIG. 1. Representative chromatogram of odour bouquets collected from empty jar, before and during swarming of *An. arabiensis* KGB strain.

columns representing the relative intensities of the same compound and marked with different letters differ significantly at $P<0.05$ according to nonparametric Quade test.

Definitions

As used herein, a "swarm" is defined as a group of flying conspecific male insects within a limited space, located in relation to a feature of the environment serving as a means to facilitate mating. Mosquitoes in a swarm are referred to as "swarming" mosquitoes, or mosquitoes that "swarm". The odours released during swarming are referred to as "swarming odours".

By "swarming pheromone" or "aggregation pheromone" is meant a chemical compound which upon release triggers a behaviour response leading to congregation, i.e. to an increase in the insect density in the vicinity of the source of the pheromone. Said pheromone also triggers the female mosquitoes to fly towards an aggregated swarming male location for coupling or mating with their desired male mosquitoes. By "aggregation composition" or "swarming composition" is meant a composition of chemical compounds which upon release triggers a behaviour response leading to congregation, i.e. to an increase in the insect density in the vicinity of the source of the pheromone. An aggregation composition or swarming composition has the same effect as an aggregation pheromone or swarming pheromone. A "swarming odour" comprises at least one aggregation or swarming pheromone or at least one aggregation or swarming composition. Within the present disclosure, "aggregation" and "swarming" may be used interchangeably for a composition in order to describe the effect of triggering a behaviour response leading to congregation of both male and female mosquitoes.

"Mosquito population surveillance" is defined as periodic monitoring of mosquito density in a certain locality and control of population size.

"Mosquito population monitoring" is defined as repeatable count of individuals during certain period of time to document changes of population size.

All amounts for specific compounds in a composition is indicated as a percentage of the total combined weight of those compounds in the composition.

DETAILED DESCRIPTION

The present invention is based on male mosquito swarming odours, or aggregation compositions, which attract both males and virgin females to swarm and mate.

The inventors have used a method for analysing and specifying the composition of swarming odours from different strains of mosquitoes, comprising the steps of:
a) enclosing 25-35 male mosquitoes in a container with outlets for odour collection;
b) collection of odours during swarming by said mosquitoes using solid phase micro extraction (SPME);
c) thermally desorbing the trapped odours into an injector of a gas chromatograph (GC);
d) measuring components comprised in the odours as well as amounts thereof by GC coupled to mass spectrometer or flame ionisation detector;
and thereby determining the exact composition of said swarming odour.

By the use of the above mentioned method, the inventors were able to define the composition of the swarming odours collected from swarming mosquito males.

According to one aspect, the present invention provides for mosquito aggregation compositions comprising decanal and optionally one or more of octanal, nonanal, sulcatone, and 3-hydroxy-2-butanone.

The mosquito strains studied and targeted within the present invention are African malaria mosquitoes. More specifically *Anopheles gambiae* (*An. gambiae* s.l.) and *Anopheles arabiensis* (*An. arabiensis*) species of mosquitoes, both of which are important vectors for parasites such as *Plasmodium*, which causes malaria, have been used in the experiments. However, the compositions according to the present invention may be used to attract all mosquito species, and will have an attraction effect on both males and females of all mosquito species. The inventors have also seen an effect on *Anopheles coluzzii* (*An. coluzzil*), *Anopheles merus* (*An. merus*), and *Anopheles funestus* (*An. funestus*).

The mosquito aggregation composition may comprise 0-70 wt % octanal, 0-70 wt % nonanal, 10-70 wt % decanal, 0-40 wt % sulcatone and –0-30 wt % of 3-hydroxy-2-butanone.

When octanal, nonanal and/or sulcatone is/are present in the composition, the amount of octanal, nonanal and/or sulcatone is above 0 wt %.

When 3-hydroxy-2-butanone is present in the composition, the amount of 3-hydroxy-2-butanone is above 0 wt %.

The composition according to one embodiment comprises octanal, nonanal, decanal and sulcatone.

The ratio of octanal:nonanal:decanal:sulcatone in the composition may be 11:41:34:14. This ratio for the composition is particularly applicable to a KGB strain of *An. Arabiensis*, as well as *An. gambiae* s.l.. However, also *An. coluzzii, An. merus*, and *An. funestus* have been shown to react to this specific composition (data not shown).

The composition according to another embodiment comprises octanal, nonanal, decanal, sulcatone and 3-hydroxy-2-butanone.

The ratio of octanal:nonanal:decanal:sulcatone:3-hydroxy-2-butanone in the composition may be 15:28:31:21:5. This ratio for the composition is particularly applicable to a Dongola strain of *An. Arabiensis*, as well as *An. gambiae* s.l.. However, also *An. coluzzii, An. merus*, and *An. funestus* have been shown to react to this specific composition (data not shown).

The composition may comprise 0.00001 wt %, or 0.0001 wt %, or 0.001 wt % of one or more of octanal, nonanal, sulcatone and/or 3-hydroxy-2-butanone. It may be preferable to keep the amount of these four components, when present in the composition, as low as possible, but above zero. Thus, when present, the amount of octanal, nonanal, sulcatone and/or 3-hydroxy-2-butanone is above 0 wt %. The specific combination and amount of octanal, nonanal, sulcatone and 3-hydroxy-2-butanone in the composition will be tailored to have the highest bioactivity for any specific mosquito strain.

The compositions according to the present invention may be prepared in a liquid form. Said liquid form can thereafter be evaporated slowly by the use of wicks.

The composition in liquid form according to the present invention may be formulated with a suitable solid or semi-solid carrier. Such carrier may for instance be:
a wax, wax-like, gel or gel like material;
an absorbent solid material or material capable of having the liquid composition adsorbed thereon; or
a solid matrix capable of having the liquid composition contained therein.

The present invention further provides for the use of a mosquito aggregation composition as a mosquito attractant. According to the present invention, both males and virgin females prefer the odour of this composition compared to purified air. By use of the composition according to the invention as a mosquito attractant, it is thus possible to attract and lure both male and virgin female mosquitoes.

In a further aspect of the present invention, there is provided a device for trapping mosquitoes. Said device comprises a composition according to the present invention as a species specific lure to attract mosquitoes. Devices that may be used for trapping mosquitoes using for instance LED lights, UV light, carbon dioxide, etc., are well known within the technical field.

Blood feeding by mosquitoes is a behaviour that is almost exclusively performed by adult female mosquitoes carrying eggs after mating. The use of the composition according to the present invention makes it possible to lure the female virgin mosquitoes before they mate with a male. The mosquitoes may further be trapped after having been lured by the use of the composition. Consequently, the females may be trapped before mating and hence before the need of blood feeding occur. Thereby, the transmission of any parasites or pathogens from a female mosquito vector to another organism, such as a human, may be avoided, by trapping said female virgin mosquito vector before mating.

The device may further comprise an effector for elimination or killing of the mosquitoes having been attracted to the device. The attracted mosquitoes may be eliminated by one of commercially available effectors including, but not limited to, electric grid, killing agent treated surfaces, sterilizing stations, etc. Any insecticide or pesticide may be used as the killing agent.

The device may additionally or alternatively further comprise sticky inserts to fixate the mosquitoes within the device. The sticky insert is preferably exchangeable. Such sticky inserts, optionally exchangeable, are readily available and well known to the person skilled in the art. When an exchangeable sticky insert is used, the device may be used several times. If the sticky insert is not exchangeable, the device will be of a disposable type that may only be used one time.

By the use of a sticky insert, both mosquito population surveillance and mosquito population monitoring is enabled. The quantity of mosquitoes may be determined after removing the sticky insert from the device and counting of the fixated mosquitoes. Thus, according to one aspect of the invention, a method for population surveillance is thus provided using the device as disclosed above.

Furthermore, the mosquitoes fixated to the sticky insert may be analysed in order to determine the percentage of mosquitoes being vectors of pathogens and/or parasites. Thus, according to a further aspect of the invention, a method for risk assessment in epidemiological monitoring programmes is provided using the device as disclosed above.

According to yet a further aspect of the invention, a method is provided by which the method for qualitative and quantitative evaluation of swarming odours from mosquitos mentioned above is used for assessing of mosquito male quality. By this method, odours from 25-35 male from two groups of mosquitoes is collected and measures as described above. One group comprises males treated with a sterilizing agent, the second group comprises non-treated males. Thereafter a comparison is made of the odours from the two groups, in order to determine if males treated with a sterilizing agent will be able to compete with non-treated males for the female mosquitoes in a swarming context.

Thereby, an improvement of SIT is provided by first ensuring the ability of sterile males to compete for mates with the wild ones in the field, using the method of the present invention. Sterile males that have said ability to compete for mates, by releasing swarming odours, may then be released so that they may compete for the attention of female mosquitoes, leading to an inhibition of reproduction of the mosquitoes.

EXPERIMENTAL SECTION

Figure 2A:
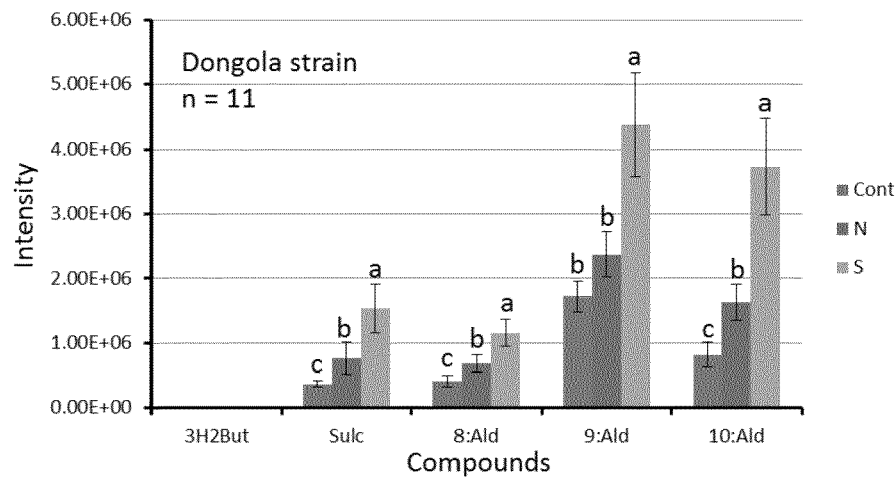
FIG. 2. Relative intensities of odours collected from empty jar, before and during swarming of *An. arabiensis* mosquitoes of (A) KGB and (B) Dongola strain. Cont— empty jar; N—before swarming; S—swarming; n is number of replicates; 3H2But—3-hydroxy-2-butanone; Sulc—sulcatone; 8:Ald—octanal; 9:Ald—nonanal; 10:Ald—decanal, vertical bars are standard errors.
Figure 2B:
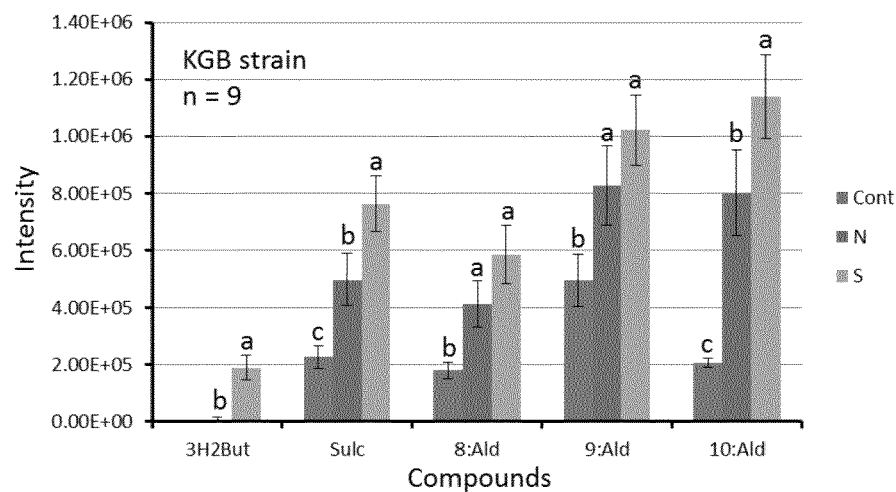

Composition of swarming odour of *An. arabiensis* species is identified as octanal, nonanal, decanal, sulcatone and 3-hydroxy-2-butanone in the ratio 15:28:31:21:5 respectively, for KGB strain and in the ratio 11:41:34:14:0 respectively for Dongola strain (see FIGS. 1 and 2).

Attractiveness tests carried out in two choice Y olfactometre revealed that males (75%) and virgin females (90%) significantly ($p<0.001$) preferred the arm of olfactometer with airflow bearing three-component blend versus the control arm containing only purified air.

The invention claimed is:

1. A mosquito aggregation composition consisting of decanal, nonanal and 3-hydroxy-2-butanone, octanal, sulcatone and a carrier.

2. The composition according to claim 1, consisting of 0-70 wt % octanal, at most 70 wt % nonanal, 10-70 wt % decanal, 0-40 wt % sulcatone and at most 30 wt % of 3-hydroxy-2-butanone.

3. The composition according to claim 1, consisting of octanal, nonanal, decanal, sulcatone and 3-hydroxy-2-butanone in the ratio of 15:28:31:21:5 (weight).

4. A method of using the composition according to claim 1 as a mosquito attractant.

5. A mosquito trapping device comprising the composition according to claim 1 as a species specific lure to attract mosquitoes.

6. The device according to claim 5, further comprising an effector for elimination of mosquitoes having been attracted to the device.

7. The device according to claim 5, further comprising sticky inserts to fixate mosquitoes having been attracted to the device.

8. A method for mosquito population surveillance or monitoring and/or risk assessment in epidemiological monitoring programs, comprising using the device of claim 5, and analysis of the mosquitos having been attracted to the device, to evaluate quantity of mosquitos and/or percentage of mosquitos being vectors of pathogens and/or parasites.

* * * * *